United States Patent [19]

Cole

[11] Patent Number: 4,917,854

[45] Date of Patent: Apr. 17, 1990

[54] METHOD AND ARRANGEMENT FOR CONSOLIDATING AND STORING NOZZLES REMOVED FROM NUCLEAR FUEL ASSEMBLIES

[75] Inventor: William G. Cole, Monroeville, Pa.

[73] Assignee: Westinghouse Electric Corp., Pittsburgh, Pa.

[21] Appl. No.: 236,719

[22] Filed: Aug. 26, 1988

[51] Int. Cl.[4] .............................................. G21C 19/00
[52] U.S. Cl. .................................... 376/272; 206/499; 376/260
[58] Field of Search ............... 376/272, 261, 260, 262; 250/506.1, 507.1; 206/499, 500; 414/788.9, 790.2, 792.7, 146

[56] References Cited

U.S. PATENT DOCUMENTS

| | | | |
|---|---|---|---|
| 2,181,198 | 11/1939 | Moskowitz | 206/500 |
| 3,124,249 | 3/1964 | Flashman | 206/500 |
| 4,030,975 | 6/1977 | Anthony et al. | 376/446 |
| 4,208,248 | 6/1980 | Jabsen | 376/446 |
| 4,292,130 | 9/1981 | Viaud et al. | 376/446 |
| 4,535,250 | 8/1985 | Fields | 250/507.1 |
| 4,599,213 | 7/1986 | Leclercq et al. | 376/446 |
| 4,620,960 | 11/1986 | Wilson et al. | 376/446 |
| 4,624,616 | 11/1986 | Freese | 414/797.7 |
| 4,646,414 | 3/1987 | Wilson et al. | 29/723 |
| 4,646,415 | 3/1987 | Wilson | 29/723 |
| 4,655,990 | 4/1987 | Leclercq | 376/446 |
| 4,664,875 | 5/1987 | Shallenberger et al. | 376/261 |
| 4,667,547 | 5/1987 | Shallenberger et al. | 376/261 |
| 4,671,405 | 6/1987 | Hagan | 206/499 |

Primary Examiner—Daniel Wasil

[57] ABSTRACT

Both a method and arrangement for consolidating and storing nozzles removed from nuclear PWR fuel assemblies is disclosed herein. In the method of the invention, top or bottom nozzles that are removed from nuclear fuel assemblies incident to a reconstitution procedure are stacked one upon another. The resulting stack of either top or bottom nozzles is secured together by a combination of plates, rods having threaded ends, and nuts which do not increase the outer dimensions of the nozzles forming the stack. This allows the resulting stack to be loaded into a spent fuel bin where the secured stack of nozzles may be stored in a consolidated manner for ultimate disposal. To implement the method of the invention, a nozzle stacking bin is provided which provides a means for receiving individual nozzles and forming a stacked assembly of such. A securing means for binding the stack assembly together is further provided as well as a nozzle handling tool for manipulating the nozzles into the stacking bin and, in the case of top nozzles, also for bringing the nozzles to and from a nozzle turnover device.

13 Claims, 8 Drawing Sheets

METHOD AND ARRANGEMENT FOR CONSOLIDATING AND STORING NOZZLES REMOVED FROM NUCLEAR FUEL ASSEMBLIES

BACKGROUND OF THE INVENTION

1. Field Of The Invention

The present invention relates to methods and arrangements by which a plurality of waste PWR fuel assembly nozzles can be stored, in consolidated form, for ultimate disposal as radioactive waste.

2. Description Of The Prior Art

Fuel assemblies for pressurized water (PWR) type nuclear reactors include opposing top and bottom nozzles disposed on either end of any array of elongated fuel rods and control guide thimbles. After a fuel assembly has been in a nuclear reactor for a period of time, it sometimes becomes necessary to gain access to the control rods, an operation which requires removal of at least the top nozzle. In a fuel assembly reconstitution operation, the removed, original top nozzle becomes waste, and a new top nozzle is installed before the reconstituted fuel assembly is placed back in the reactor. When the fuel rods within the assembly become spent, both the top and bottom nozzles become radioactive waste along with the rest of the fuel assembly. In both cases, the waste nozzles need to be disposed of. Unlike some .components, the heavy metallic structure of such waste nozzles are not subject to significant compaction despite efforts to consolidate such nozzles by crushing their attachments by compression. The disposal problem is exacerbated by the fact that no new nuclear waste sites have been approved in recent years and many of the existing ones have been filled to capacity with radioactive waste. Thus, nuclear powered utility plants do not now have a repository to which their waste nozzles may be shipped for disposal and such will not be available for an indefinite period of time in the future. Consequently, nuclear reactor utility plants have no choice but to store the growing number of waste nozzles on site in an ever decreasing amount of storage space. Thus there is an increasing need to find a way to consolidate such waste nozzles in order to make the most efficient use of the limited amount of on site waste storage space. While successful techniques have been developed for consolidating spent fuel rods and skeletal frames of the fuel assemblies, no effective method or arrangement has heretofore been devised to effectively and efficiently consolidate the top and bottom nozzle of such fuel assemblies.

SUMMARY OF THE INVENTION

The present invention seeks to provide a method and arrangement which will allow the handling and temporary storage of waste top and bottom nozzles in a reduced amount of storage space without significantly increasing the quantity of additional materials which will have to be disposed of as nuclear waste.

In accordance with the method of the invention, top or bottom nozzles removed from nuclear fuel assemblies are stacked one upon another. The resulting stack of either top or bottom nozzles is secured together by means which do not increase the outer diameter of the nozzles forming the stack so the stack may be loaded into a spent fuel bin, within which the secured stack of nozzles can be stored in a consolidated manner for ultimate disposal For performing this method, an arrangement for transferring and storing the nozzles removed from the fuel assemblies generally comprises a nozzle stacking bin Which provides a means for receiving individual nozzles and forming a stacked assembly of such, a securing means for binding the stacked assembly together, and a fuel storage bin of the type normally present in the spent fuel pool of a nuclear facility within which the secured stacked assembly can be received for storage on site and ultimate disposal off site.

In accordance with a preferred embodiment of the arrangement, the securing means for binding together, a stacked assembly of nozzles includes opposing end plates disposed on the top and bottom ends of the stack which are linked together by tie rods that extend through the central openings already present in the nozzles. Fasteners are used to connect the plates to the tie rods. Furthermore, a nozzle handling tool is provided for manipulating nozzles into the stacking bin and, in the case of top nozzles (every other one of which must be inverted for consolidated storage) also for bringing the nozzles to and from a nozzle turnover device. The nozzle turnover device is preferably comprised of a pair of slide-in, open ended receivers that are mounted to freely rotate about a horizontal axis in combination with stops for limiting the free rotation to 180 degrees.

In accordance with a specific, preferred embodiment of the method of the invention the transferring step involves releasably gripping a waste nozzle with a nozzle handling tool and manipulating this tool so as to transfer the nozzle to a nozzle turnover device. The subsequent step of stacking includes the steps of operating the nozzle turnover device optionally through use of the nozzle handling tool to invert a nozzle, after which the nozzle handling tool is utilized to transfer the inverted nozzle to a nozzle stacking bin within which it is temporarily stored while these steps are repeated to build up a stack of, for example, eight like top nozzles or ten like bottom nozzles within the stacking bin, after which a securing step is performed by inserting tie rods through all of the nozzles of the stack and attaching the tie rods to end plates disposed at top and bottom ends of the nozzle stack to secure the stack together.

These and other objects, features and advantages of the present invention will become more apparent from the following description when taken in connection with the accompanying drawings which show, for purposes of illustration only, a single embodiment in accordance with the present invention.

DETAILED DESCRIPTION OF THE PREFERRED EMBODIMENT

Figure 1:
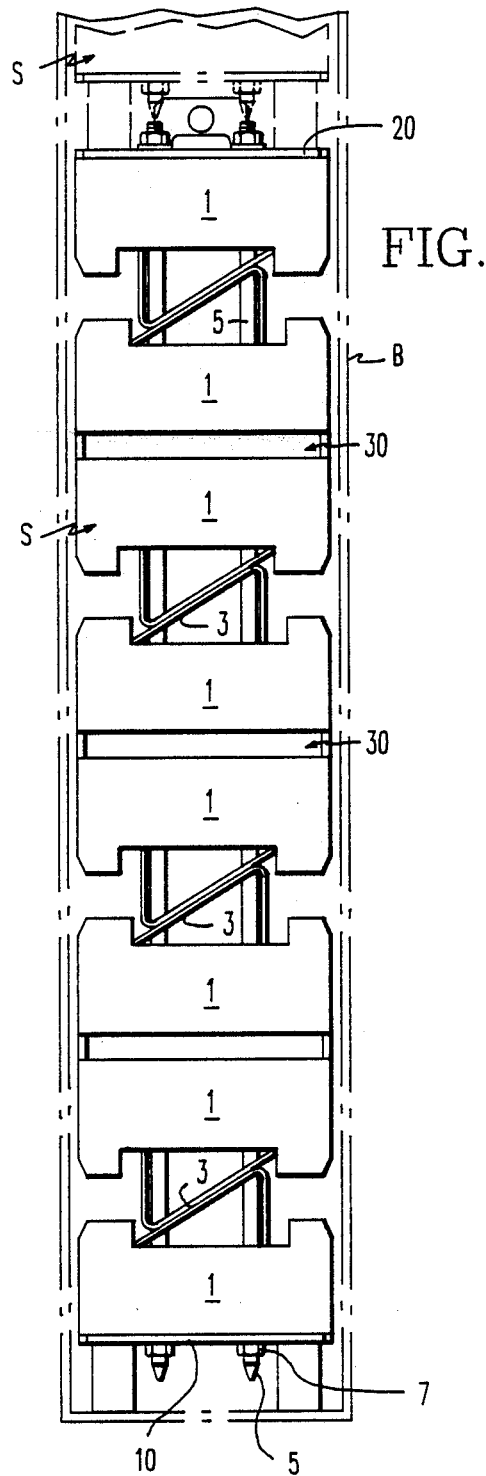
FIG. 1 is a side elevational view of a consolidated, secured stack of top nozzles within a diagrammatically depicted spent fuel storage bin.
Figure 2:
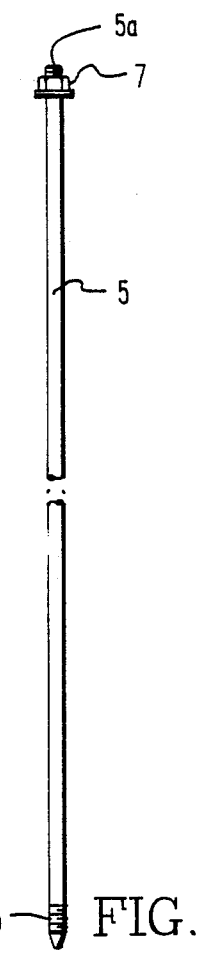
FIG. 2 is a side view of a tie rod of the secured nozzle stack of FIG. 1.

FIG. 1 illustrates the storage of secured stacks S of top nozzles 1 within a spent fuel bin B (illustrated in phantom lines) as is achieved in accordance with the method and arrangement of the invention for consolidating and storing nozzles removed from nuclear fuel assemblies. Typically, four nozzle stacks S as produced in accordance with the present invention can be stored in one conventional spent fuel storage bin B. Each stack S must be kept to a reasonable size commensurate with regulations that require that all work with such radioactive material be done under water without coming within five feet of the surface of the water of the work station. Thus, a stack S of top nozzles is preferably formed from eight top nozzles 1 which, when secured together, form a stack about 40 inches high.

The stack S of the top nozzle shown in FIG. 1 consists of four pairs of oppositely facing nozzles. Typically, each nozzle 1 has a spring 3 (shown for the particularly illustrated nozzle as being wedge-like in shape) on its bottom side as well as other attachments. Thus, arranging the nozzles 1 in pairs of nozzles wherein the wedge-shaped springs 3 on the top sides of each pair face each other and interfit in a complementary manner achieves a achieves compactly nested arrangement without the need for crushing the wedge-shaped springs 3 or any other attachments on the nozzles.

The stack S is secured together by a pair of tie rods 5 having top and bottom threaded ends 5a, 5b which receive nut-like fasteners thereon. These tie rods 5 require no modifications to the nozzles 1, but rather can be received within preexisting passages in the nozzles 1 such as those intended to receive instrument rods or other tubes.

Figure 4:
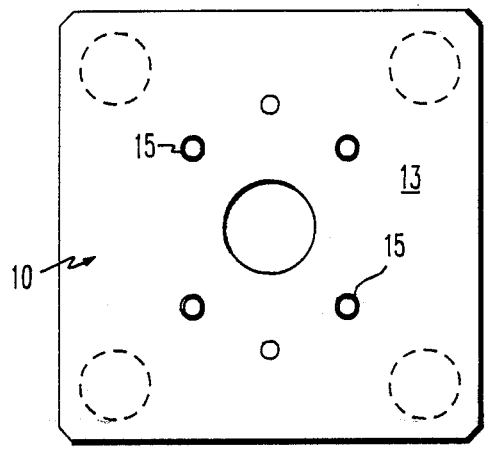
FIGS. 3 and 4 are side elevational and top plan views of a bottom end plate of the top nozzle stack shown in FIG. 1.
Figure 3:
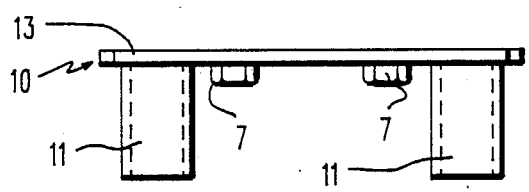

To support the stack and facilitate its formation, a bottom plate assembly 10 (FIGS. 3, 4) is provided which has four tubular legs positioned at the corners of a plate 13 forming the bottom of the assembly 10. Furthermore, the nut-like fasteners for the bottom threaded end 5b of the tie rod 5 are secured, such as by welding, at each of four through-holes 15 that are drilled through plate 13 at positions aligned with the instrument rod tubes of the top nozzles 1, even though only two of such through holes will be utilized. As a result, a symmetrical arrangement is provided that eliminates the need for any particular side of the bottom plate 10 to be placed into registry with a particular side of the nozzles 1. The height of the legs 11 is chosen to provide sufficient clearance for the bottom end 5b of the tie rod 5 as it is threaded through and out of the respective fastener 7.

Figure 6:
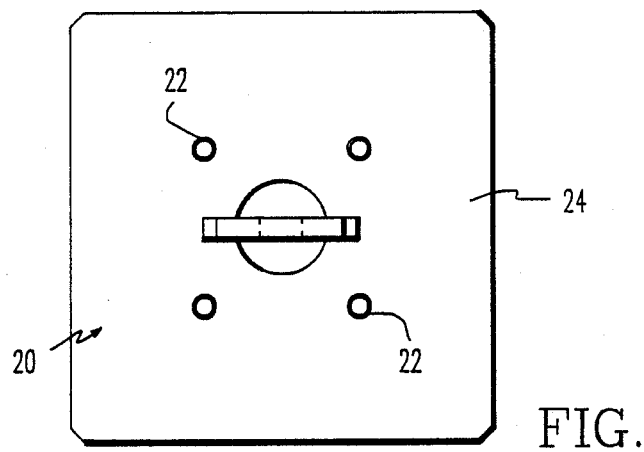
FIGS. 5 and 6 are views, similar to FIGS. 3 and 4, of the top end plate of the top nozzle stack in FIG. 1.
Figure 5:
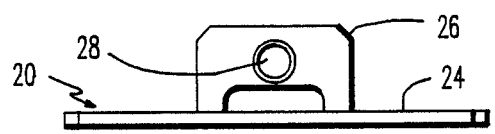

At the top of the stack S, a top plate 20 (FIGS. 5, 6) is provided that has through holes 22 formed therein at positions aligned with the end holes 15 of the bottom plate 10 and the instrument tubes of the nozzles 1. The top plate 20 is advantageously a simple flat plate 24 to which a lifting bracket 26 is attached by welding. Lifting bracket 26 may have one or more apertures 28 in order to facilitate lifting and lowering of the secured stack by an appropriate mechanism that forms no part of this invention.

Figure 8:
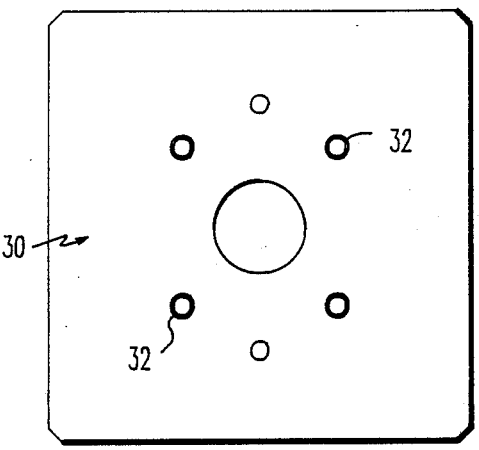
FIGS. 7 and 8 are side elevational and top plan views of a spacer plate of the top nozzle stack shown in FIG. 1.
Figure 7:
Figure 10:
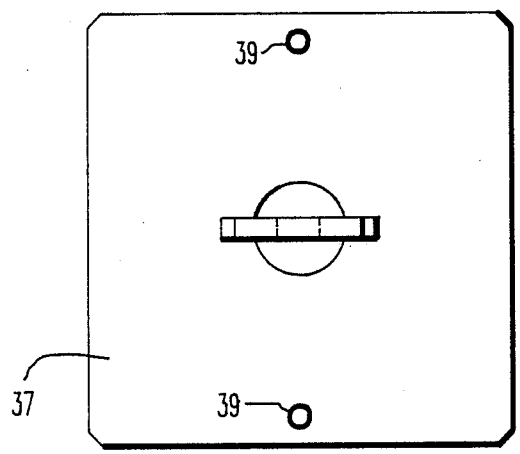
FIG. 10 is a top plan view of a top end plate of the bottom nozzle stack of FIG. 9.

In addition to the above-noted top and bottom plates, a spacer plate (FIGS. 7, 8) is positioned between each pair of bottom nozzles 35 for stability. Spacer plates 30 are simple flat plates having holes 32 matched to the holes 15, 24 of the bottom and top end plates 10 and 20, respectively, through which the tie rods 5 may pass.

Figures 9, 11:
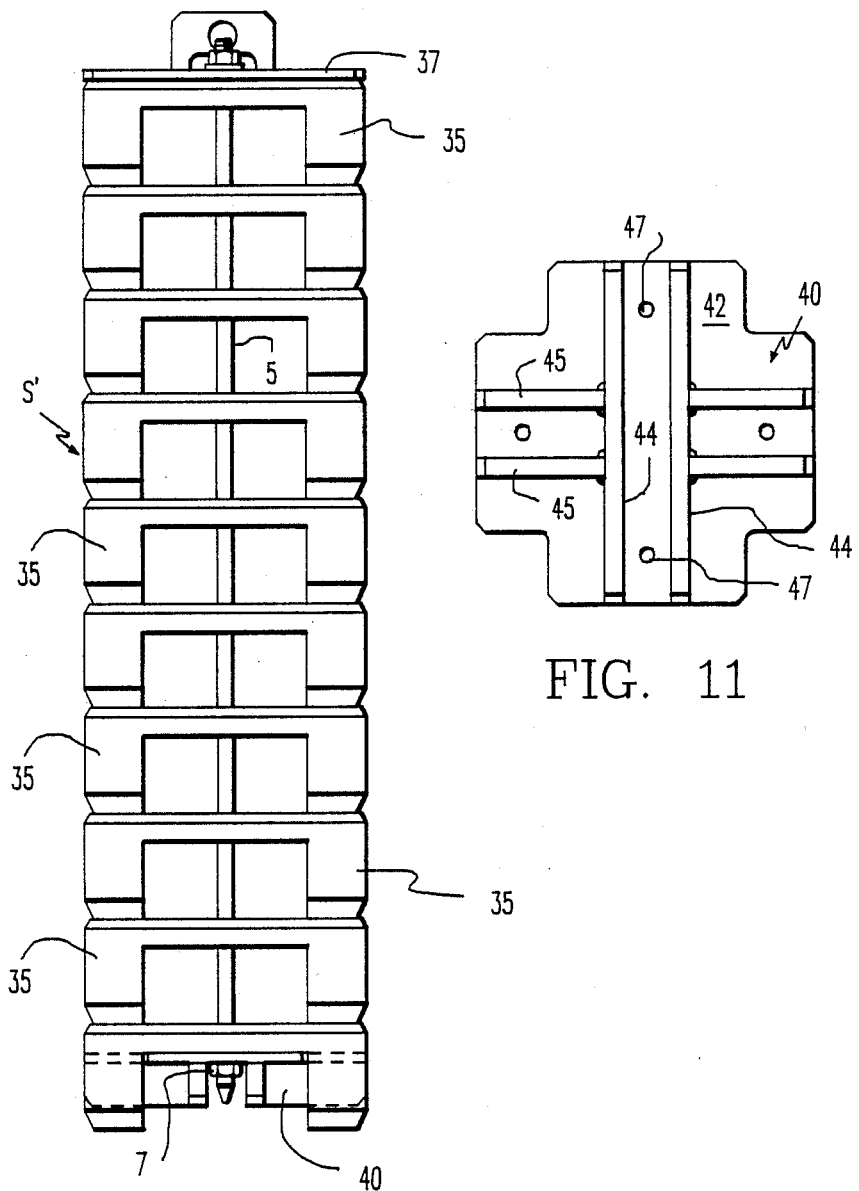
FIG. 9 is side elevational view of a secured stack of bottom nozzles.
FIG. 11 is a bottom plan view of a bottom end plate of the bottom nozzle stack of FIG. 9.

FIG. 9 shows a secured stack of S' of waste bottom nozzles that have been removed from nuclear fuel assemblies. Such a stack S' may be stored within a spent fuel bin B in the same manner as the stack S shown in FIG. 1. Ten bottom nozzles 35 form a stack S' that is approximately of the same height as a stack S of top nozzles 1 so that four such stacks (in any combination of stacks S, S') may be stored within a single conventional spent fuel bin B. Since the bottom nozzles 35 do not carry springs (such as the wedge-shaped springs 3 of the top nozzles 1 or other equivalent, potentially interfering, attachments) the nozzles 35 may all be stacked in the same top-end-down orientation and without the need for intervening spacer plates equivalent to spacer plates 30.

For securing the bottom nozzles 35 into stack S', the same tie rods used for the stack S may be utilized. A pair of tie rods 5 serve to clamp the bottom nozzles 35 between a top plate 37, which corresponds essentially to top plate 20 except for the placement of tie rod holes 39 relative to holes 22 of top plate 20, and a bottom end plate 40. As can be seen from FIG. 11, bottom end plate 40 includes a flat, cruciform plate 42, having stand-off legs 44, 45 welded on its underside. These legs 44, 45 serve to lift plate 42 sufficiently for the lower end of tie rod 5 to be inserted through a pair of holes 47 and threaded into nuts 7 (which have been omitted from FIG. 11) that are secured to the underside of plate 42 in the same manner as done for the bottom plate 10. The cruciform shape of bottom plate 40 enables it to nest within the lower most bottom nozzle of stack S', as shown in FIG. 9.

Having described the consolidated configuration achieved by virtue of the present invention, the method and arrangement utilized to obtain same in accordance with the present invention will now be described. Firstly, for removal of a stand of nozzles from a fuel assembly, the fuel assembly is removed from the spent fuel pit of the nuclear utility and inserted in an upright position into a work station in the utility wherein the top nozzle is first removed, followed by the inversion of the fuel assembly and removal of the bottom nozzle. These operations do not form part of the present invention and ar carried out with the fuel assemblies submerged under water in the work station by any means known in the art, which typically involve manipulation of remotely-controlled submersible equipment due to the need for the fuel assembly to remain, at all times, under water.

Figure 12:
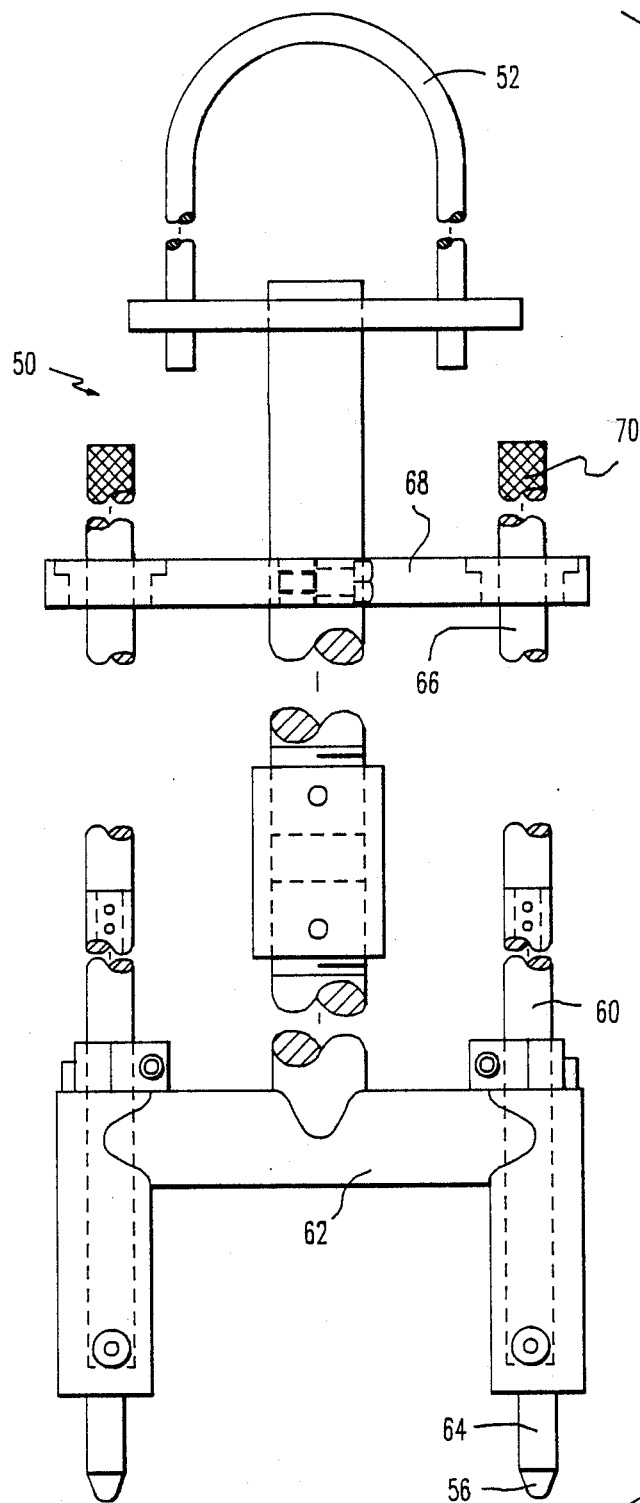
FIG. 12 is a partial elevational view of a nozzle handling tool in accordance with the present invention.
Figure 14:
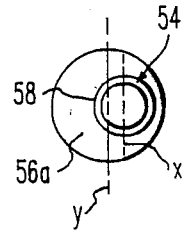
FIGS. 13 and 14 are side elevational and top plan views of eccentric gripping elements of the nozzle handling tool of FIG. 12.
Figure 13:
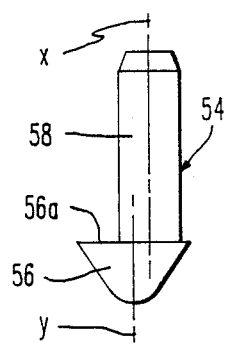

Once the top and bottom nozzles have been severed from a particular fuel assembly, the first step of the method of the invention is to transfer each of the removed nozzles to either a nozzle turnover device 80 (in the case of every other top nozzle 1), or a nozzle receiver 82 (in the case of all bottom nozzles 35). For this purpose, a hand manipulable, nozzle handling tool, designated 50 as a whole, is provided. The nozzle handling tool 50 has a handle 52 for enabling manipulation thereof for transferring a particular nozzle 1, 35 from the fuel assembly. For purposes of gripping a nozzle, tool 50 has a pair of gripping elements 54, each of which includes a generally conically shaped gripping head 56, the base of which includes a mounting pin 58 that extends so that the longitudinal center axis is eccentrically disposed relative to the longitudinal center axis Y of the gripping head 56. The pin 58 of gripping element 54 is connected to the bottom end of a lower actuation shaft segment 60 so as to rotate with rotation of shaft segment 60, which in turn is journaled within a mounting yoke element 62. Before connection to the lower end of segment 60, pin 58 is passed through a bore that is eccentrically located through a sleeve 64 disposed on the bottom ends of each leg of yoke 62. The eccentricity of the bore within sleeve 64 is matched to the eccentricity existing between axes X, Y of pin 58 and gripper head 56 so that, in an insertion orientation such as shown FIG. 12, the base of the gripper head 56 will be matched to the circular periphery of the sleeve 64, but upon rotation thereof, the gripper head will be displaced out of alignment with sleeve 64 so as to cause a portion of base surface 56a to seat against the underside of a nozzle to prevent withdrawal of the sleeve 64 from the hole in the nozzle through which it was inserted. To produce rotation of shaft segment 60, and with it gripping element 56, an upper shaft extension 66 is connected to each shaft segment 60. Upper shaft extension 66 is journaled near its top end, in a bearing brace 68 and the free top end thereof has a narrowed peripheral surface portion 70 which enables it to be more easily rotated by the fingers of an operator.

In use, tool 50 will be manipulated via handle 52 into a position so that the sleeves 64, with the gripper elements 54 in their position having gripper heads 56 aligned with sleeve 64, are disposed above a pair of holes of a nozzle to be transferred. Such holes may be, for example, cooling holes, guide thimbles, etc., depending on the nature of the particular nozzle. Then, the gripping element 54 and sleeve 64 are inserted through the nozzle holes until the gripper head 56 emerges at the underside thereof. At such time, the operator applies a twisting force to the narrowed surfaces 70 causing rotation of the gripping elements out of alignment with the sleeves 64, thereby locking tool 50 to the nozzle to be transferred.

Figure 17:
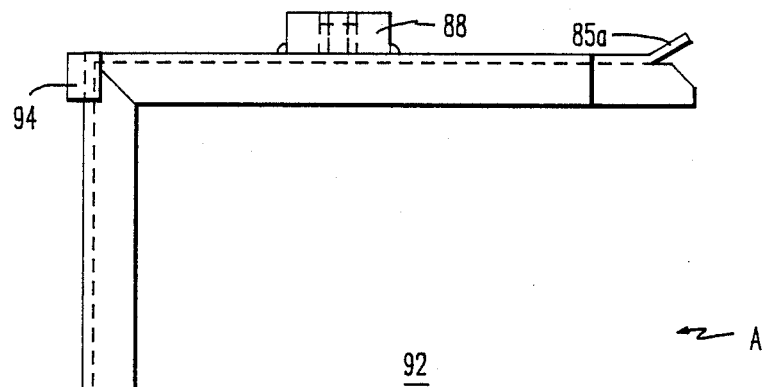
FIG. 17 is a top plan view of the nozzle receivers as shown in FIG. 16.
Figure 17:
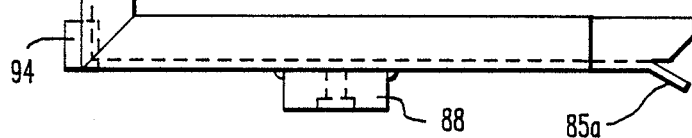
Figure 16:
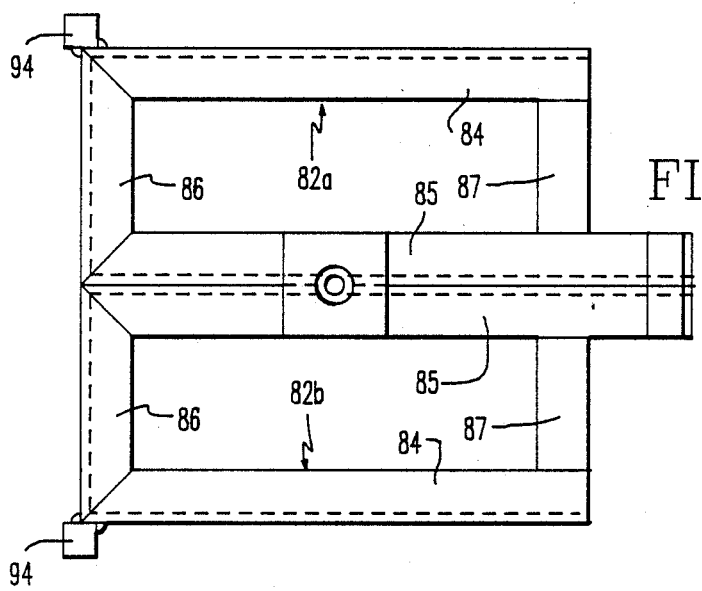
FIG. 16 is a view taken along line XVI—XVI of FIG. 15 showing an end of the nozzle receivers of the nozzle turnover device.
Figure 18:
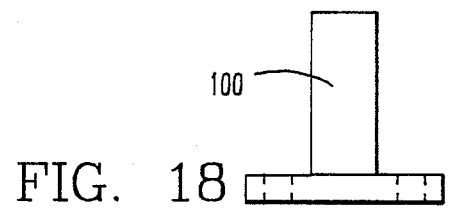
FIG. 18 is a side elevational view of a stop element of the nozzle turnover device shown in FIG. 15.

In the case of half of the top nozzles to be stacked in accordance with the present invention and in the case of all of the bottom nozzles 35 to be stacked in accordance therewith, the nozzle 1 locked onto the lower end of tool 50 will be transferred into a nozzle turnover device 80 which will now be described relative to FIGS. 15–18. Nozzle turnover device 80 is comprised of a pair of slide-in receivers 82a, 82b which are joined together with both of the receivers 82a, 82b having an open end facing in the same direction. As seen looking toward the open end of the receivers 82a, 82b (as in FIG. 15) the height of each receiver 82a, 82b is slightly larger than the height of each nozzle (the typical nozzle being approximately 3 inches high) and slightly wider than the width or length of the nozzle (which on a typical nozzle is approximately 7¾ inches in each direction). Located at each lateral side of the receivers 82a, 82b (FIG. 16) are top and bottom angle irons 84, 85, a rear angle iron 86, and a front brace strap 87. The bottom angle irons 85 of the two receivers 82a, 82b are fixed together so as to create an essentially square frame work at the center of which the journal bearing 88 is affixed. The lateral sides of the receivers are connected at top and bottom sides thereof by top and bottom angle irons 89, 90 at only the rear ends thereof. The result is a slide-in framework in the nature of a rack having an open front end and a closed rear end that is C-shaped when viewed from above (FIG. 17). As a result, a nozzle affixed to tool 50 in a bottom-end-down orientation can be slid laterally into the top one of the pair of receivers (receiver 82a in FIG. 15) with the handle of the nozzle handling tool projecting upwardly, the lateral edges of the nozzle being guided along bottom angle irons 85 until the nozzle abuts against the back end of the receiving space 92 of the receiver. To facilitate the initial sliding in of the nozzle, the front end of angle irons 85 are laterally flared at 85a. Lastly, as apparent from FIGS. 15–17, abutment blocks 94 are provided at diagonally opposite corners of the joined pair of receivers (upper right and lower left as seen in FIG. 15).

Figure 15:
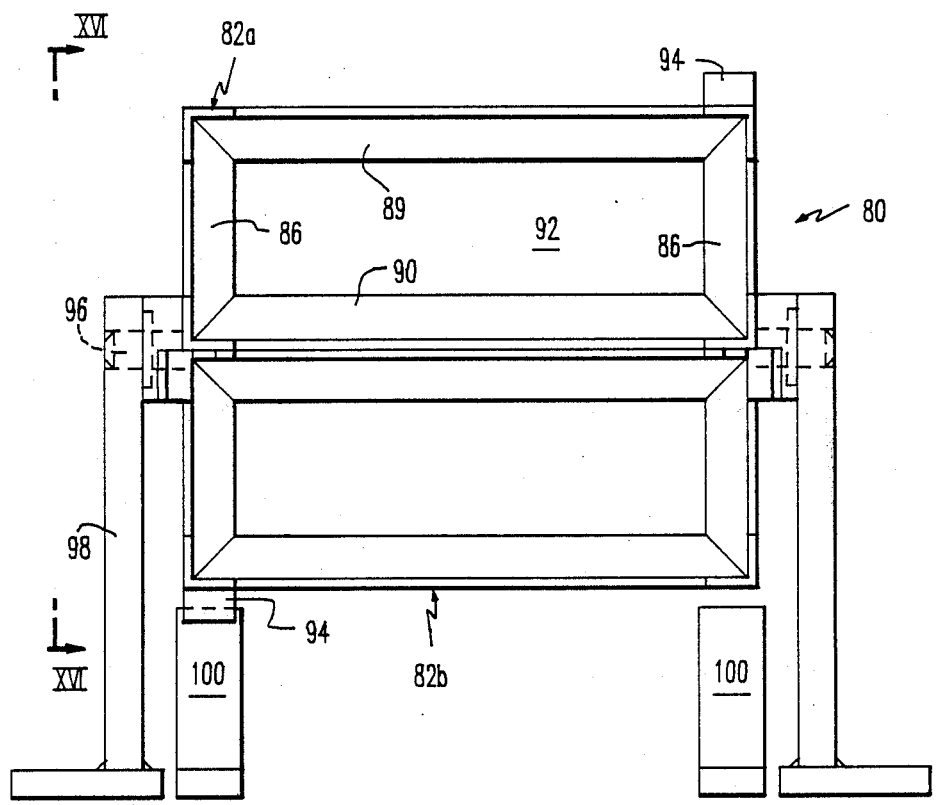
FIG. 15 is a front elevational view of a nozzle turnover device in accordance with the present invention.

As can be seen from FIG. 15, the journals 88 are connected by bearing fins to stations 98. In this way, the receivers 82a, 82b are mounted for free rotation about a horizontal axis. However, to limit this free rotation to 180 degrees, a pair of inverted T-shaped stops 100 (FIG. 18) are fixed in place so as to be engaged by a respective one of abutment blocks 94 at a side which permits an exchange of positions between the two receivers 82a, 82b only by rotation in the direction faced by the rear end of the receiver located on top to prevent the nozzle contained therein from falling out. For example, as illustrated in FIG. 15, the abutment block 94 of receiver 82b is in a position abutting the left side stop 100 at a side thereof which would permit the receivers to be rotated only in a counterclockwise direction (as viewed relative to FIG. 16) until such a point that the stop block 94 of the receiver 82a hits right side stop 100, after which the positions of the receiver could only be reexchanged by a return, clockwise rotation of 180 degrees back to the position shown in FIG. 15. To produce this rotation, after a nozzle has been slid into place within the bottom located receiver, handling tool 50 is detached therefrom. The tool now may be pushed against the nozzle held in the receiver in the direction A (FIG. 17).

Figure 20:
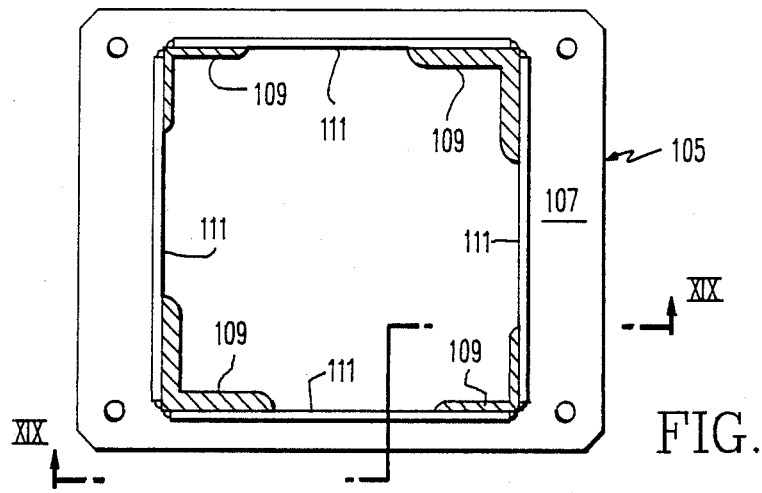
FIG. 20 is a sectional view taken along line XX—XX of FIG. 19.
Figure 19:
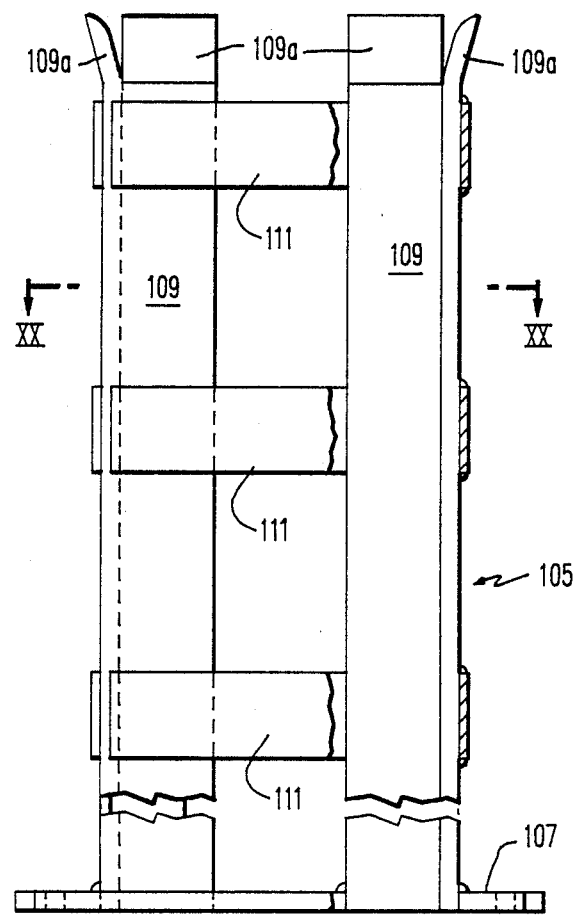
FIG. 19 is a partial sectional view taken along line XIX—XIX of FIG. 20.

After a nozzle has been inverted by the 180 degree rotation of the receivers of nozzle turnover device 80, nozzle handling tool 50 is then reconnected thereto an utilized to slide the nozzle back out along the angle iron 84. Once removed from the turnover device 80 (or in the case of a top nozzle which is to be stacked in its normal orientation) the nozzle handling tool 50 is utilized to transfer the nozzle to a nozzle stacking bin 105 (FIGS. 19, 20). Stacking bin 105 is comprised of a base plate 107 from which vertically projects four angle irons 109 which are braced with a plurality of bracing straps 111. As a result, the bin has an elongated, rectangular shape of a cross-section conforming to the periphery of the nozzles. To facilitate lowering of the nozzles into the bin 105, the upper ends 109a are flared outwardly to provide insertion guides. In this regard, prior to insertion of the first nozzle of a given stack to be created, an appropriate bottom plate 10 or 40 will be inserted, and after insertion of the last nozzle of a given stack, a top plate will be inserted into the bin. Thereafter the tie rods 5 will be inserted through the plates and nozzles and fastened so as to clamp the nozzles between the plates in a secured unit that can then be transferred as a whole to a spent fuel storage bin within which it is to be stored until it can be ultimately disposed of.

As is evident from the foregoing, the arrangement in accordance with the present invention enables a very simple method for consolidating and storing nozzles removed from nuclear reactor fuel assemblies to be achieved that will result in a significant reduction in the amount of space required for such components without significantly increasing to the amount of radioactive waste that must be ultimately disposed of. The method is easy to conduct despite the restrictions upon handling of nuclear waste that calls for operations to be conducted under five feet of water, since the method is merely composed of a series of simple horizontal and vertical transferring steps which may be performed with the nozzle handling tool and which, in conjunction with the nozzle turnover device of the inventive arrangement, permits a sequential stacking of like nozzles one upon the other (either all top and down in the case of bottom nozzles or in pairs of inverted and right-side up nozzles in the case of top nozzles). The nozzle stacking bin enables the sequential stacking of nozzles to be easily carried out and forms a framework within which the secured assembly of stacked nozzles can be produced via the tie rods utilized to clamp the stacked nozzles between the top and bottom end plates, with or without interposed spacer plates. Finally, since the assembly of secured stacked nozzles has outer dimensions that are no larger than a fuel assembly, they can be stored back inside the spent fuel bins until they are disposed of as nuclear waste.

I claim:

1. An arrangement for transferring and storing of nozzles removed from nuclear reactor fuel assemblies, comprising:
    a. a nozzle stacking bin means for temporarily storing a plurality of nozzles therein in a stacked assembly;
    b. securing means for holding said stacked assembly together; and
    c. a fuel storage bin for receiving a secured stacked assembly for storage and ultimate disposal;
wherein said nozzle stacking bin comprises a base plate from which four angle irons vertically project that are braced by a plurality of bracing straps in a manner creating an elongated nozzle stacking bin of a rectangular cross section conforming to that of the nozzles to be stacked therein; and wherein upper ends of the angle irons are flared outwardly to provide insertion guides for the nozzles.

2. An arrangement according to claim 1, wherein said securing means comprises tie rods, end plates and means for holding said end plates on said tie rods.

3. An arrangement according to claim 2, wherein said end plates have apertures matched to openings in nozzles to be secured between said end plates; wherein said tie rods have a diameter sized for passage through said apertures, and wherein said means for holding comprises threaded fasteners for threaded engagement on a threaded end of the tie rods.

4. An arrangement according to claim 3, wherein said arrangement further comprises a nozzle handling tool having means for releasably gripping a nozzle.

5. The arrangement according to claim 4, wherein said nozzle handling tool has a handle for enabling manipulation thereof for transferring of a nozzle from a fuel assembly.

6. An arrangement according to claim 4, wherein said means for releasably gripping comprises gripping elements each of which is eccentrically mounted at an end of a rotatable shaft for a rotation about an axis that is offset relative to the axis of rotation of the rotatable shaft between respective positions for insertion and gripping of a nozzle.

7. An arrangement according to claim 1, wherein said arrangement further comprises a nozzle handling tool having means for releasably gripping a nozzle.

8. The arrangement according to claim 7, wherein said nozzle handling tool has a handle for enabling manipulation thereof for transferring of a nozzle from a fuel assembly.

9. An arrangement 7, for transferring and storing of nozzles removed from nuclear reactor fuel assemblies, comprising:
    a. a nozzle stacking bin having means for temporarily storing a plurality of nozzles therein in a stacked assembly;
    b. securing means for holding said stacked assembly together; and
    c. a fuel storage bin for receiving a secured stacked assembly for storage and ultimate disposal;
wherein said arrangement further comprises a nozzle handling tool having means for releasably gripping a nozzle; and wherein said means for releasably gripping comprises gripping elements, each of which is eccentrically mounted at an end of a rotatable shaft for rotation about an axis that is offset relative to the axis of rotation of the rotatable shaft between respective positions for insertion and gripping of a nozzle.

10. An arrangement for transferring and storing of nozzles removed from nuclear reactor fuel assemblies, comprising:
    a. a nozzle stacking bin having means for temporarily storing a plurality of nozzles therein in a stacked assembly;
    b. securing means for holding said stacked assembly together; and
    c. a fuel storage bin for receiving a secured stacked assembly for storage and ultimate disposal,
wherein said arrangement further comprises a nozzle turnover device having means for inverting a nozzle.

11. An arrangement according to claim 10, wherein said means for inverting comprises a pair of slide-in receivers pivotally mounted for rotation about a horizontal axis.

12. An arrangement according to claim 11, wherein said receivers are fixed together with both of the receivers having an open end facing in the same direction; wherein the pivotal mounting of the receivers comprises a pivotal mounting of the receivers for free rotation about a horizontal axis; and wherein stop means are provided for limiting said free rotation to 180 degrees.

13. A consolidated stack of nozzles from nuclear reactor fuel assemblies comprising:
    a. a plurality of like nozzles removed from nuclear reactor fuel assemblies, each of which has a planar side, an oppositely facing nonplanar side and a plurality of apertures extending from said planar side to said nonplanar side;
b. spacer plates having at least two holes at positions matched to corresponding apertures in the nozzles;
c. end plates having at least two holes at positions matched to corresponding apertures in the nozzles; and
d. tie rods;

wherein said nozzles are arranged in pairs of nozzles having nonplanar sides directed toward each other; wherein said pairs of nozzles are stacked one upon another with a respective one of the spacer plates being disposed between facing planar sides of adjoining pairs and with at least two apertures of the stacked nozzles being in alignment with each other and with the holes in the spacer plates; wherein an end plate is disposed on the top and on the bottom of the stacked nozzles with the holes of the end plates aligned with the apertures of the nozzles; and wherein said tie rods are inserted through the aligned holes and apertures and clamp the stacked nozzles between said end plates.

* * * * *